Jan. 12, 1960 M. G. STROMQUIST 2,920,392
BEVEL PROTRACTOR
Filed Oct. 12, 1953
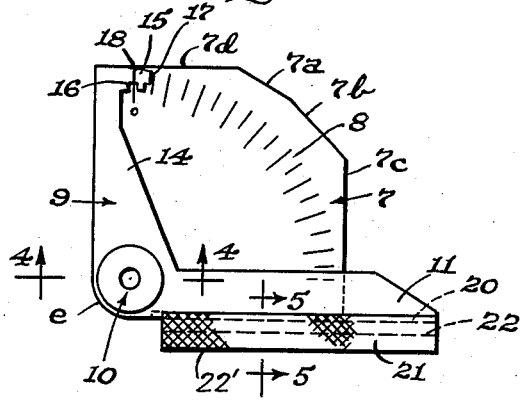
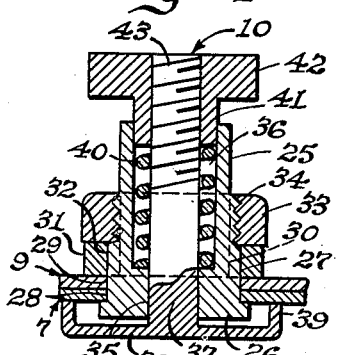
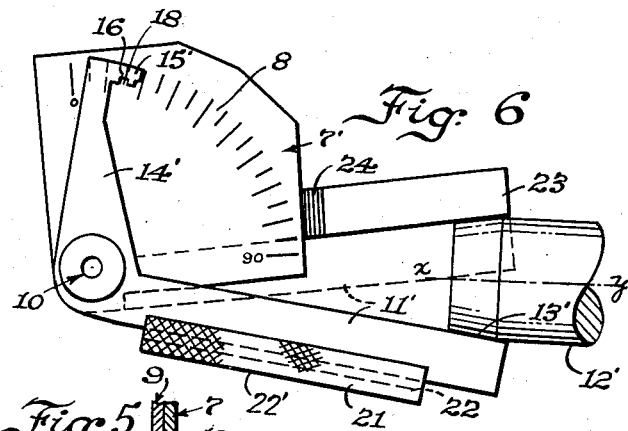
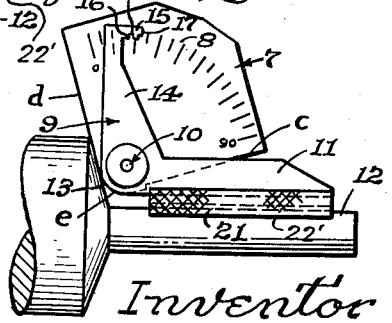
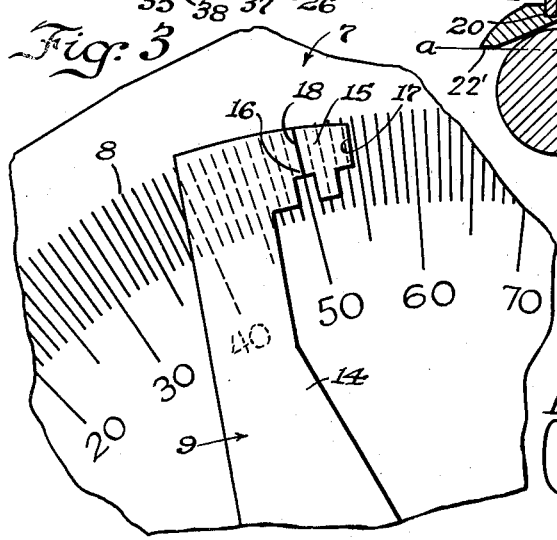
Inventor
Martin G. Stromquist
Atty.

United States Patent Office 2,920,392
Patented Jan. 12, 1960

2,920,392

BEVEL PROTRACTOR

Martin G. Stromquist, Rockford, Ill.

Application October 12, 1953, Serial No. 385,408

2 Claims. (Cl. 33—75)

This application is a continuation-in-part of my copending application, Serial No. 333,409, filed January 27, 1953, which resulted in Patent No. 2,689,406, issued September 21, 1954.

This invention relates to measuring instruments, such as bevel protractors, for use by machinists and inspectors of machine parts for measuring bevels and inside angles generally, for which the ordinary 180° protractors are not usable, and other instruments available are far too complicated and expensive, in addition to being awkward to use.

The principal objects of my invention are, firstly, to provide a bevel protractor that is easier to adjust, and, secondly, to provide a bevel protractor having work aligning means on one of the two relatively adjustable parts of the instrument so as to insure closer accuracy in the measurement of an inside angle, and thirdly, to provide a bevel protractor of modified form having jaw extensions on the two relatively adjustable members, whereby to enable accurate measurement also of outside angles, the jaw extension being disposed in coplanar relation in order to increase the accuracy of measurement.

The invention is illustrated in the accompanying drawing, in which—

Fig. 1 is a face view of the bevel protractor made in accordance with my invention;

Fig. 2 is a similar view on a smaller scale showing how the instrument is adapted to be used in measuring an inside angle;

Fig. 3 is an enlarged elevation of a portion of the instrument of Figs. 1 and 2 to better illustrate the feature whereby reading accurately to a half-degree is made possible;

Fig. 4 is a section through the tension joint taken on the line 4—4 of Fig. 1;

Fig. 5 is a section on the line 5—5 of Fig. 1, and

Fig. 6 is a view similar to Fig. 1 showing a protractor of modified or alternative construction designed for the measurement of both inside and outside angles.

Similar reference numerals are applied to corresponding parts throughout these views.

Referring first to Figs. 1 to 5, the reference numeral 7 designates a plate that is substantially square, the same having a bottom edge c and a side edge d at right angles to one another, said plate forming the body of the instrument and having suitable graduations thereon arranged in an arc as indicated at 8, and 9 is the cooperating right angle or L-shaped member pivoted at 10 with respect to plate 7 and having its outer edges in right angle relationship and registrable with the edges c and d of plate 7, as seen in Fig. 1. The parts 7 and 9 have registering arcuate edges e struck on arcs of equal radius, with the pivot 10 as a center. Angles of 30°, 45° and 90° are preferably provided on the edges of the plate, as shown at 7a, 7b and 7c. The top 7d is 180°. One arm 11 of the right angle member 9 is adapted to bear along one edge on the work on the surface 12, as indicated in Fig. 2, and the plate 7 is adapted to be swung into a position engaging along its one edge the bevel 13, whereupon the reading for the angle is taken by reference to the scale 8, relative to which the other arm 14 of the right angle member 9 has assumed the position indicated in Fig. 2. The index projection 15 on the outer end of the arm has a notch 16, which, in the zero position shown in Fig. 1 is opposite the zero reading on the scale 8, and which, in Fig. 2, indicates the angularity of the bevel 13 beyond a right angle. To facilitate measurements to within a half a degree the index portion 15 has its radial edged extremity 17 exactly 4½ degrees away from the center line 18 of notch 16. In that way it is a simple matter to read accurately to within at least one-half a degree, because, in the event the index mark 18 does not register with one of the graduation lines of scale 8, the chances are that the extremity 17 will register with a graduation line or come sufficiently close to such registration, so that the operator, making allowance for the 4½ degrees spacing of 17 with respect to 18 can quickly read the angle indicated. If only the one index mark 18 were provided the operator could, of course, approximate the reading but in that event would have nothing with which to gauge his approximation. The second reference line 17 is, therefore, a real help.

The lower edge portion of arm 11 is sweat-soldered at 19 in a groove 20 provided in the top of a supporting base member 21 which has a V-shaped groove 22 in the bottom thereof, as shown in Fig. 5, to enable quickly aligning the protractor with the piece of work being measured, the surface 12 on the work then having line contact at two points on the two faces of the V-groove 22. With these two line contacts there is every assurance that the instrument is accurately aligned with the work and hence much closer accuracy is obtainable in the measurement of inside angles, as illustrated in Fig. 2. At the same time, this feature does not interfere with the free use of the instrument in the measurement of outside angles, as illustrated in Fig. 6, where the instrument is of modified form to permit such use. The base 21 has flat bottom surfaces 22' in coplanar relation in a horizontal plane in perpendicular relation to the vertical plane of arm 11. The protractor can, therefore, be placed on a flat surface, as indicated by the dot and dash line ab in Fig. 5, to measure the inside angle of a shoulder extending therefrom, the angle being measured in the same way as the bevel 13 in Fig. 2.

In Fig. 6, the arm 11 is of greater length than arm 11 in Fig. 1, the same having an extension on the end remote from the pivot 10 to form one "jaw" of what may be termed a pair of outside calipers, 23 being the other "jaw" and being in a form of an arm extension from the plate 7', the major portion of which is bent into offset relation to the plate 7', as indicated at 24, so as to lie in coplanar relationship with arm 11', to enable closer accuracy in the measurement of outside angles on pieces of work placed between these "jaws."

When these jaws 11' and 23 are closed, as indicated by the dotted line showing of arm 11', the arm 14' is on zero, the same as the arm 14 in Fig. 1. Hence, when the angularity of a bevel, like that shown at 13', is to be measured and this bevel is entered between the jaws, as shown, the angle indicated by the index end 15' of arm 14' is the sum of the angles on the two sides, and, when that is divided by two, this gives the angle of the bevel in relation to the center line x—y of the cylindrical piece of work 12'. This instrument can, of course, also be used in measuring inside angles the same as in Fig. 2.

In closing, the pivot 10 is like that shown and claimed in the parent application. It is shown here in enlarged section in Fig. 4 and is designed to provide a more or less permanently adjustably fixed friction drag and also a readily adjustable spring tension to increase the resistance to relative pivotal movement of the parts 7 and 9 to whatever extent the operator may desire in a given situation. The pivot 10 consists of a hollow stud 25 having a flat head 26 on one end and a smooth cylindrical shank portion 27 next to the head, that has a close working fit in registering cylindrical holes 28 and 29 provided in the parts 7 and 9. Parallel flats are provided on the stud 25 on diametrically opposite sides intermediate its ends and upwards from the smooth cylindrical shank portion 27, as indicated at 30, and a washer 31 having an oblong hole 32 is nonrotatable on the stud 25 by reason of its abutment with the flats 30 so that a nut 33 threaded on the stud 25 at 34 may be tightened to exert more or less friction drag by pressure between head 26 and washer 31. The nut 33 can, of course, be adjusted to maintain a certain friction drag more or less permanently, and inasmuch as there is nothing to tend to loosen the nut 33 in the normal usage of the instrument, the nut is never apt to require tightening unless the instrument is used frequently and there is sufficient wear on the parts to necessitate tightening of the nut to maintain the desired amount of friction drag. Now, there is a center hole 35 provided in the head end of stud 25 and a registering coaxial bore 36 in the shank portion, and a bolt 37 is entered through the hole 35 and has a hollow circular flat head 38 which encloses the head end 19 of the stud and has its annular rim portion 39 abutting the bottom face of the plate 7 in radially outwardly spaced relation to the head 26, as clearly appears in Fig. 4. This bolt 37 has a coiled compression spring 40 surrounding it and housed in the bore 36 and arranged to be compressed between the inner end of the bore and the reduced cylindrical shank portion 41 of a nut 42 that is threaded on the threaded end portion 43 of the bolt. Obviously, the more the nut 42 is tightened the greater is the spring loading on the head 38 pressing the parts 7 and 9 together to give increased friction drag, above that afforded by the adjustment of nut 33. The operator can, therefore, obtain as much friction drag on the operation of the instrument as he prefers under given circumstances, without changing the adjustment of the nut 33. The nut 42 will when tightened far enough contact the end of stud 25 and thus prevent further tightening before the spring 40 is compressed to the point of closing the coils thereof solidly upon one another. Consequently, this portion of the tension adjustment always exerts yielding tension, the extent depending, of course, upon how much the nut 42 is tightened. This double tension adjustment, one of which may be more or less permanently fixed and is positive, and the other of which is quickly adjustable and applies more or less spring tension as may be desired to increase the friction drag, is, of course, useful on various instruments and tools, wherever a similarly tensioned pivotal joint is needed. Aside from the flexibility of the adjustment which the construction just described affords, it should, of course, be clear that the construction is such that the adjustments may be made without danger of affecting the setting of the instrument. In many pivotal joints designed to be tensioned, the constructions employed are such that the tightening of the tension nut has a tendency to exert a twist on the members that are pivotally connected by the joint, thereby making it difficult to loosen or tighten the nut and still maintain a given angular setting of the members.

It is believed the foregoing description conveys a good understanding of the objects and advantages of my invention. The appended claims have been drawn to cover all legitimate modifications and adaptations.

I claim:

1. A protractor of the character described comprising a plate having a bottom edge and a side edge at right angles to one another, and an L-shaped member superimposed on and in close surface to surface abutment with said plate also having outer edges in right angle relationship registering with the aforesaid edges of said plate, said L-shaped member being pivoted on said plate to permit angular adjustment of said member relative to said plate in the measurement of inside angles when the side edge of said plate engages one face of an inside angle and the bottom edge of said L-shaped member is parallel to the other face of said angle, said plate and said L-shaped member having registering arcuate edges struck on arcs of equal radius with the pivot of said L-shaped member as the center, said plate having an arcuately arranged scale thereon concentric with the said pivot, and said L-shaped member having a pointer which when the bottom and side edges of the plate and member register points to zero on the scale, there being an extension on the horizontal or lower arm of the L-shaped member adapted to serve as one jaw of an outside angle measuring calipers, and said plate also having a horizontal extension whose lower edge is parallel to the bottom edge of said plate and has abutment substantially its full length with the top edge of said L-shaped member arm extension when the pointer indicates a zero angle, said plate extension being adapted to serve as the companion jaw of the outside angle measuring calipers, the plate extension having the major portion of its length disposed in coplanar relationship with said L-shaped member arm extension.

2. A protractor of the character described comprising a plate having a bottom edge and a side edge at right angles to one another, and L-shaped member superimposed on and in close surface to surface abutment with said plate also having outer edges in right angle relationship registering with the aforesaid edges of said plate, said L-shaped member being pivoted on said plate to permit angular adjustment of said member relative to said plate in the measurement of inside angles when the side edge of said plate engages one face of an inside angle and the bottom of said L-shaped member is parallel to the other face of said angle, said plate having an arcuately arranged scale thereon concentric with the pivot, and said L-shaped member having a pointer which when the edges of the plate and member register points to zero on the scale, and a supporting base for the protractor provided on the bottom edge of said L-shaped member below the bottom edge of said plate adapted to facilitate alignment of the L-shaped member with the axis of a piece of work on which the protractor is placed for measurement of an inside angle, said base having an elongated V-groove provided on the bottom thereof the apex of which lies in the same plane with the abutting surfaces of the plate and L-shaped member, the angularly disposed flat faces of said groove being at the same angle to the plane of said abutting surfaces on opposite sides thereof and adapted to have line contact with the work on parallel lines located at equal distances on opposite sides of and parallel with the axis of the work, there being an extension on the horizontal or lower arm of the L-shaped member adapted to serve as one jaw of an outside angle measuring calipers, and said plate having a horizontal extension whose lower edge is parallel to the bottom edge of said plate and has abutment substantially its full length with the top edge of said L-shaped member arm extension when the pointer indicates a zero angle, said plate extension being adapted to serve as the companion jaw of the outside angle measuring calipers, the plate extension having the major portion of its length disposed in coplanar relationship with said L-shaped member arm extension.

References Cited in the file of this patent

UNITED STATES PATENTS

| | | |
|---|---|---|
| 330,799 | Orendorff | Nov. 17, 1885 |
| 423,094 | Taylor | Mar. 11, 1890 |
| 486,042 | Holland | Nov. 8, 1899 |
| 1,247,866 | Olmstead | Nov. 27, 1917 |
| 1,498,896 | Van De Veire | June 24, 1924 |
| 1,879,941 | McCabe | Sept. 27, 1932 |
| 2,562,224 | Weyrick | July 31, 1951 |
| 2,578,077 | McKnight | Dec. 11, 1951 |
| 2,658,672 | Dalzell | Nov. 10, 1953 |

FOREIGN PATENTS

| | | |
|---|---|---|
| 384,519 | Germany | Nov. 8, 1923 |
| 253,249 | Great Britain | June 17, 1926 |
| 606,459 | Great Britain | Aug. 13, 1948 |
| 824,697 | Germany | Dec. 13, 1951 |